United States Patent [19]

Ruhl et al.

[11] Patent Number: 4,472,096
[45] Date of Patent: Sep. 18, 1984

[54] OPTIMIZED FASTENER CONSTRUCTION SYSTEM AND METHOD

[75] Inventors: John H. Ruhl, Tustin; Richard D. Dixon, San Juan Capistrano, both of Calif.

[73] Assignee: Huck Manufacturing Company, Irvine, Calif.

[21] Appl. No.: 254,098

[22] Filed: Apr. 14, 1981

[51] Int. Cl.³ .............................................. F16B 19/00
[52] U.S. Cl. .................................................... 411/361
[58] Field of Search ...................... 411/43, 69, 70, 360, 411/361; 29/515, 520, 520 A

[56] References Cited

U.S. PATENT DOCUMENTS

| | | | |
|---|---|---|---|
| 2,531,048 | 11/1950 | Huck | 411/361 |
| 2,955,505 | 10/1960 | Schusner | 411/361 |
| 3,241,421 | 3/1966 | Siebol | 411/361 |
| 3,483,788 | 12/1969 | Keeler | 411/361 |
| 3,560,124 | 2/1971 | Beegene | 411/361 |
| 3,915,053 | 10/1975 | Ruhl | 411/361 |
| 4,197,782 | 4/1980 | Champoux | 411/361 |
| 4,202,242 | 5/1980 | Champoux et al. | 411/361 |
| 4,221,152 | 9/1980 | Jason | 411/360 |
| 4,324,518 | 4/1982 | Dixon | 411/361 |

Primary Examiner—Thomas J. Holko
Attorney, Agent, or Firm—Harness, Dickey & Pierce

[57] ABSTRACT

An optimized two piece fastener system and a related method for providing an optimized fastening system including a pin member and a collar having an optimized strength to weight ratio with the materials of the pin member and collar having a predetermined tensile strength ratio, the collar having a preselected excess volume to provide a desired 'overpacking' condition, the collar being of size whereby after swage it will define a minimum wall thickness whereby failure can incipiently occur in shear and/or compression and with a pull type fastener providing a breakneck groove with a preselected stress concentration factor whereby the fastener system can be set on workpieces having a collar engaging surface from 0° to 7° relative to a plane normal to the pin axis.

31 Claims, 7 Drawing Figures

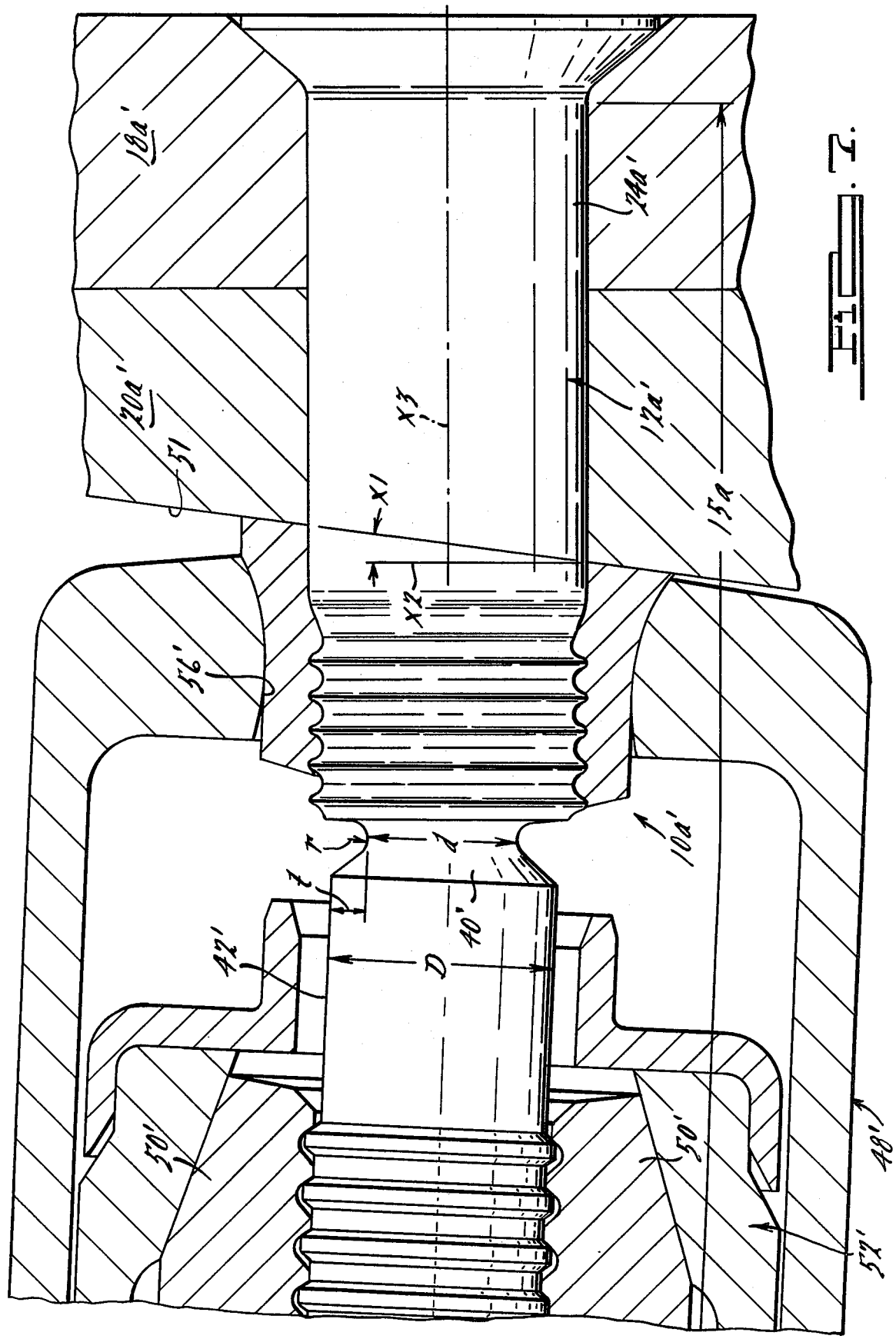

OPTIMIZED FASTENER CONSTRUCTION SYSTEM AND METHOD

SUMMARY BACKGROUND OF THE INVENTION

The present invention relates to two piece fasteners and more particularly to fasteners having a design in which the strength to weight ratio has been optimized to provide a fastener having a preselected strength at an optimized weight and to a method for providing an optimized fastening system.

In the past, fasteners have been designed with significance being given to strength and cost. While weight has been a factor, the optimization of weight has not necessarily been of prime consideration. With the advent of emphasis on fuel efficiency and on the attendant considerations of cost and availability of lightweight materials, economy in weight and efficiency in material utilization has become more significant in fastener design. This is especially true in the aerospace industry.

The present invention is specifically described for applications of two piece swage type fasteners of the type illustrated in U.S. Pat. Nos. 3,915,053 to J. Ruhl, issued Oct. 28, 1975 and U.S. Pat. No. 2,531,048 to L. Huck, issued Nov. 21, 1950. Thus the present invention will be described in connection with a two piece fastener comprised of a pin and a collar adapted to be swaged into lockgrooves in the pin. It should be understood, however, that certain features of the present invention may apply to nonswaged type fasteners.

Features of the present invention can be generally considered to include, but are not limited to, the following:

1. Reduction in overall fastener size by preselection of the ultimate shear stress of the materials of the pin member and collar to have an ultimate shear stress ratio within a preselected range,
2. Providing improved fill or packing between the swaged collar and the lockgrooves of the pin,
3. Reducing the size of the collar for a preselected tensile load carrying capacity of the fastener whereby ultimate failure can incipiently occur in shear and/or compressive failure of the collar,
4. For a pull type, swage fastener having a pin with a breakneck groove, providing the breakneck groove with a preselected stress concentration factor whereby the fastener can be set or installed on a surface having an angulation up to at least 7°.

Therefore, it is a general object of the present invention to provide an improved, optimized lightweight fastening system.

It is another general object of the present invention to provide an improved fastening system including one or more of the features noted above and those as shown and described.

Other objects, features and advantages of the present invention will become apparent from the subsequent description and the appended claims, taken in conjunction with the accompanying drawings, in which:

FIG. 7 is an enlarged fragmentary view similar to that of FIG. 5 showing the fastener after it has been set (but before pin break) for securing workpieces with the front surface having an inclination of 7°.

Figure 1:
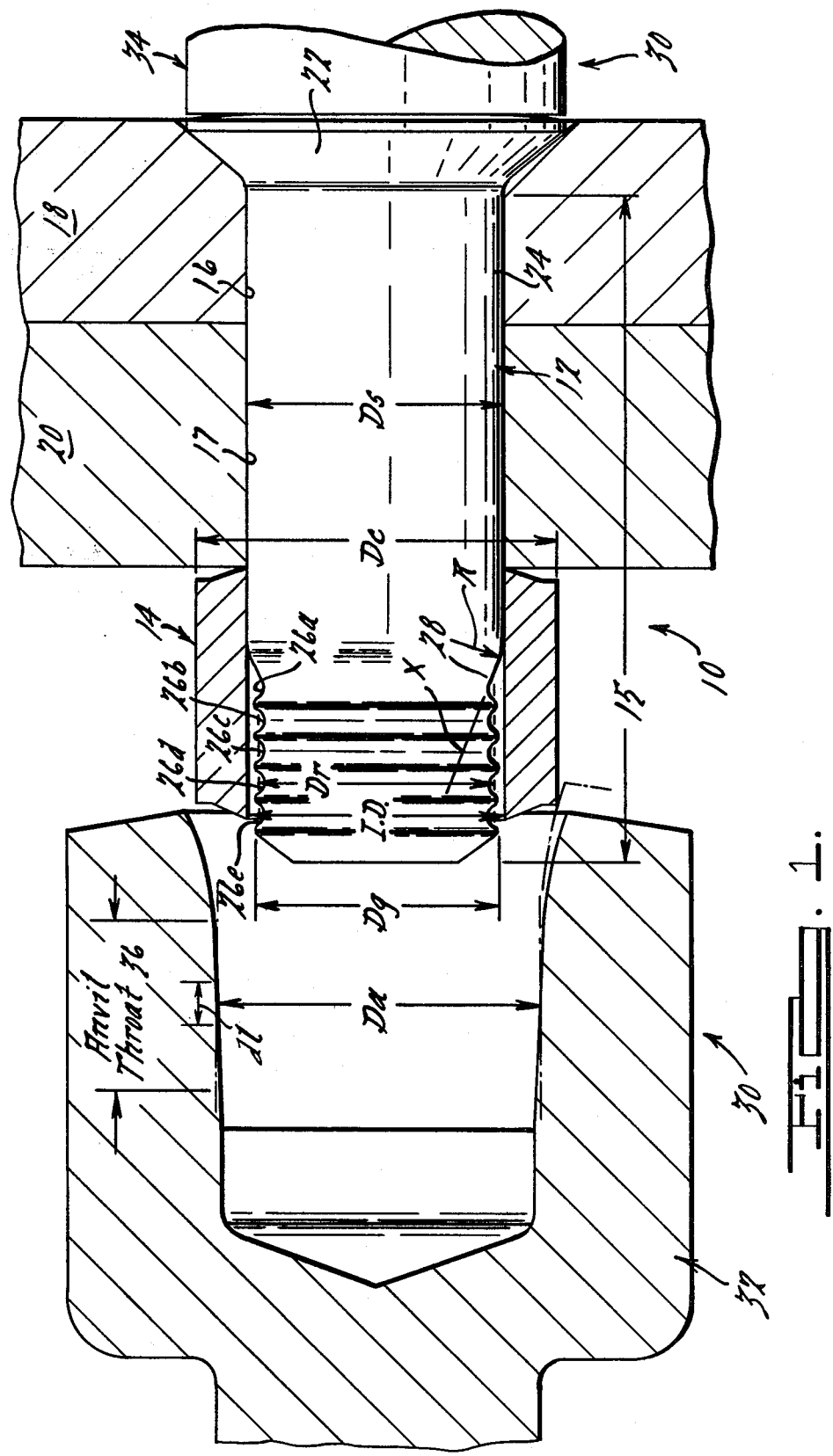
FIG. 1 is a longitudinal view with some portions shown in section and others shown broken away of a stump type fastener of the present invention and a tool for setting the same shown prior to setting with the fastener shown for assembling workpieces of a minimum thickness and with the engagement of the swage anvil of the tool shown in broken lines.
Figure 2:
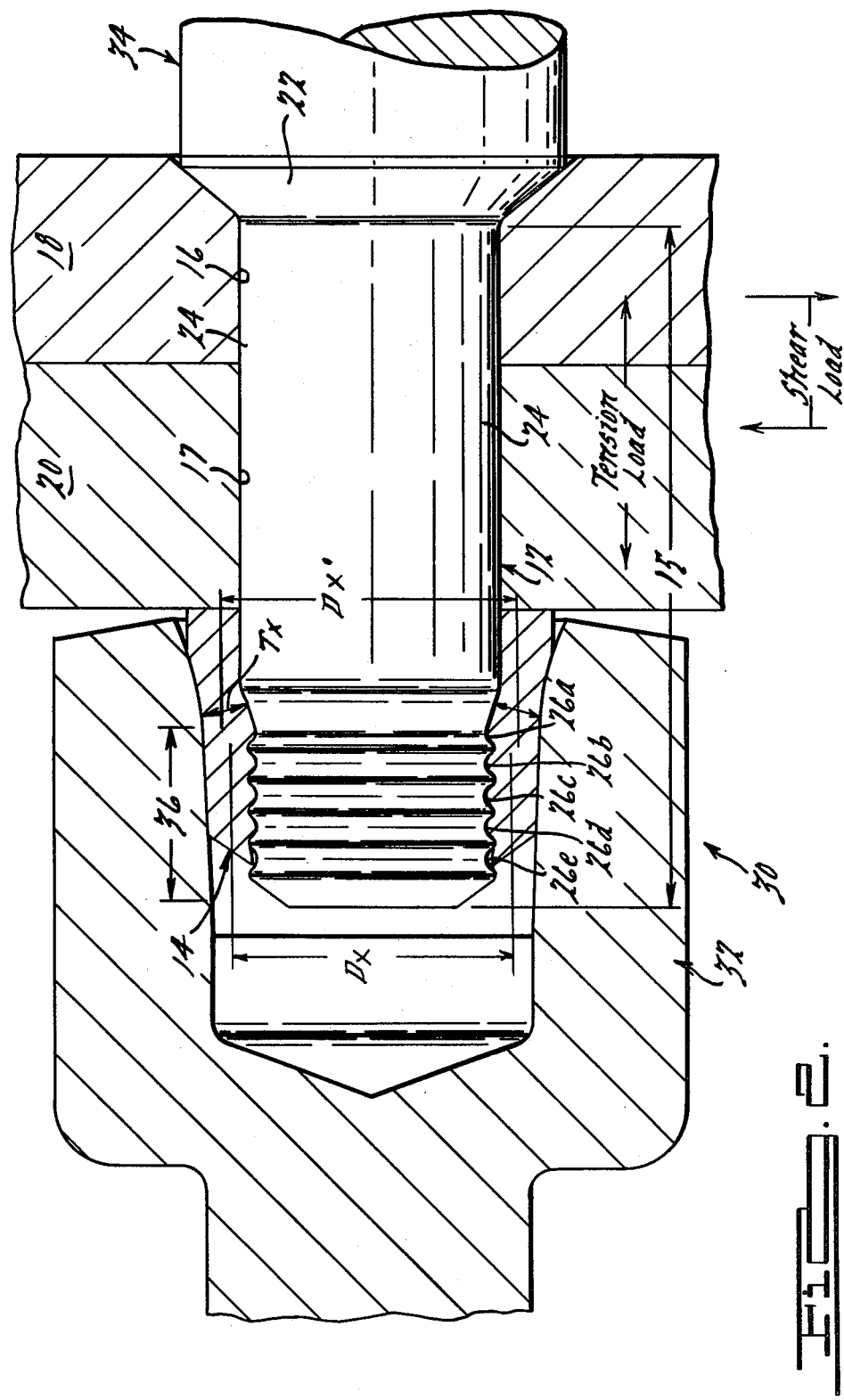
FIG. 2 is a view similar to that of FIG. 1 showing the fastener after it has been set and with the tool still engaged.

Looking now to FIGS. 1 and 2, a fastener of the present invention is indicated by the numeral 10 and is shown to include a pin member 12 and a tubular collar 14. The pin member 12 has an elongated shank 15 which can extend through aligned openings 16 and 17 in a pair of workpieces 18 and 20, respectively, to be secured together. The opening 16 terminates in a countersunk portion which is shaped to receive an enlarged flush type head 22 at one end of shank 15. Adjacent the head 22, the shank 15 has a straight portion 24 which, in one form of the invention, is adapted to be received within bores 16 and 17 with a close tolerance fit, i.e. slight clearance to slight interference. Following the straight portion 24 is a plurality of locking grooves 26a–e. While the locking grooves 26a–e are shown to be separate, annular grooves, a helical configuration could be used. The grooves preferably, have a combined circumferential extent exceeding 360° i.e. more than one groove or thread. A transition portion 28, having a preselected radius R and inclination X (relative to axis of the pin member 12), smoothly connects the locking groove 26a with the straight shank portion 24. The diameter Ds of the straight portion 24 is slightly greater than the diameter Dg of the crests of locking grooves 26a–e with Dg selected to provide a clearance with openings 16 and 17. Thus, in an interference fit condition, the radius portion R and the transition portion 28 provide a desirable surface contour for engaging the inside surfaces of openings 16 and 17 to receive the shank 15 as it is drawn therethrough.

The fastener 10 is adapted to be set by a tool 30 which includes a swaging anvil 32 and a backup member 34 which are actuable to be squeezed or impacted together to set the fastener 10. The tool 30 can generally be of a type well known to those skilled in the art and hence, for simplicity, has been only partially shown.

The symmetrically shaped, generally tubular collar 14 is adapted to be located over the shank 15 and, with the workpieces 18, 20 generally pushed or held together, will be in radial alignment with the locking grooves 26a–e. Upon actuation of the tool 30 the collar 14 will be swaged into radially confronting ones of the pin locking grooves 26a–e as the fastener 10 is set (see FIG. 2). Note that the unswaged collar 14 (FIG. 1) is generally of a uniform wall thickness except at the opposite ends where it is tapered. The tapered construction can be of a type and in accordance with U.S. Pat. No. 4,198,895 to J. Ruhl issued Apr. 22, 1980.

The locking grooves 26a–e can be of a construction as shown in the '053 Ruhl patent and be of a shape proportioned in accordance with the relative shear strengths of the materials of the collar 14 and of the pin member 12 in accordance with that patent.

The optimization of the weight of the pin member 12 and collar 14 of fastener 10 is done in consideration of the particular loads as applied thereto via the workpieces 18 and 20. In many aerospace applications there are two areas of strength considerations for fasteners, one results from the loading of the pin member 12 in shear and the other results from loading the pin 12 and collar 14 in tension. In the shear load mode, the shear stress, which results from opposite parallel force components on workpieces 18 and 20 (see FIG. 2), is taken diametrically across the straight portion 24. In the tension load mode the pin member 12 is placed in tension as a result of opposite axial force components on workpieces 18 and 20, i.e. tending to pull them apart, which are transverse to the shear load. In aerospace shear type fastener designs, whether of a threaded torque type or swage type, however, it is common that the ultimate failure in tension loading occur through the shoulders defined by the grooves (or threads). In this case the groove (or thread) shoulders will fail in shear. Thus tension loading of the fastener 10 will place the interlocking grooves and shoulders between the pin member 12 (lockgrooves 26a–e) and swaged collar 14 in shear.

In optimizing a fastener structure, such as fastener 10, the starting point in any application is the magnitude of the shear load capability of the straight portion 24 of pin 12 and the magnitude of the tension load capability of the interlocking grooves and shoulders of pin 12 and collar 14. The magnitude of both the shear and tension loads are preselected by design and hence are known for a given application.

The determination and provision of shear load capability for a member such as pin 12 can be ascertained by well known means. Once having determined the minimum diameter of straight shank portion 24 to accommodate the design level of shear load, the fastener 10 can be optimized for minimum weight and size to accommodate the design level of tension load. It is possible that the tension load design level could require a greater diameter of pin 12 to accommodate that load level. In that case, of course, the shank portion 24 would be larger than required for the shear load design level. (It is also possible that the design may dictate that the fastener not fail before the workpieces but that the fastener provide a predetermined bearing load with the failure occurring in the workpieces). As a practical matter, however, in aerospace applications for fasteners of the type shown, the primary load consideration is the design shear load for the fastener and hence after optimization for the design shear load, the fastener can be optimized for the design tension load. Thus after optimization for the design shear load, optimization of the design tension load capability for the fastener (such as fastener 10) is determined. As noted above, however, the fastener 10 is constructed such that the ultimate failure at the design tension load is expected to be in shear across the interlocking shoulders and grooves.

It should be noted that for some lightweight applications the material of the pin 12 is constructed of a costly, lightweight material such as titanium. For example, appropriate alloys of titanium will provide higher shear and tensile strength characteristics than aluminum and at the same time would provide weight advantages relative to steel. Thus the basic size of the pin member 12 will be set by the strength of the material of the pin member 12 and this size in the first instance will be dictated by and minimized (normally) to the necessary capability of the straight portion 24 to accept the design shear load.

Next the size of the remainder of the shank 15 including the lockgrooves 26a–e (and associated shoulders) must be minimized for the tension loading mode with the criteria being that failure will occur in the tension loading mode via shear across the interlocking shoulders and grooves. Hence the depth of grooves 26a–e is controlled to assure that failure will not likely occur diametrically across one of these grooves in a tension mode failure.

In aerospace applications it is typical to utilize a collar 14 made of aluminum for a pin 12 made of titanium. Since titanium is substantially more expensive and less plentiful than aluminum, it is desirable, from a cost and material availability point to use as little titanium as possible. First the minimum, required effective shear area for the shoulders defined by lockgrooves 26a–e is determined and next the minimum, required effective shear area of the complementary shoulders of the swaged collar 14 is determined.

To optimize the fastener, however, it is desirable to minimize the total volume of material of that portion of the shank 15 required to carry the lockgrooves 26a–e. This can be done by closely balancing the shear and tensile strengths of the material used in the collar 14, e.g. aluminum alloy, with that of pin 12, e.g. titanium alloy. In swage applications, however, if the collar 14 is of excessive strength, damage to the shank 15 in the area of the lockgrooves 26a–e will result during swage. Most commonly this will occur as crushing or elongation of the shank 15 and/or damage to the crests of the shoulders defined by lockgrooves 26a–e during swaging. It has been known that it is desirable to avoid and/or minimize such damage. In the present invention it is desirable to provide the collar 14 with as high a tensile yield strength as possible while avoiding the above noted damage. For this purpose, it has been found that tensile yields can be equated to ultimate material shear stress and that it was desirable to utilize a pin member 12 of a material having an ultimate shear stress in a range of from around 1.8:1 to around 2.7:1 relative to the ultimate shear stress of collar 14. In one application utilizing a pin 12 of 6Al-4V titanium alloy and a collar 14 of 2024-T4(2) aluminum alloy a desirable ratio of around 2.5:1 resulted. An example of another suitable combination of different materials having the desired ratio is a pin 12 of 7178-T6 aluminum alloy and a collar 14 of 6061-T4 aluminum alloy; another combination can be of a pin member 12 of heat treated 8740 alloy steel and a collar 14 of 7175-T73 or 7050-T73 aluminum. By maximizing the strength of the collar 14 to a point where swaging can be accomplished just short of damage to the pin member 12, the number and/or combined length of lockgrooves 26a–e required to support the shear stress resulting from tension loading can be minimized; thus a low ratio is desirable. It is also desirable, as noted, that the width of grooves 26a–e and shoulders defined thereby be proportioned relative to the shear strengths of the materials of pin 12 and collar 14 such that both the shoulders defined by grooves 26a–e of the pin 12 and the shoulders defined by interlocking grooves of the swaged collar 14 are in incipient or simultaneous failure in shear at the preselected maximum design tensile load on workpieces 18 and 20. In practice it is preferred that the design provide for the shoulders defined by the grooves of collar 14 to fail prior to the shoulders defined by lockgrooves 26a–e of pin 12, i.e. the shoulders of pin 12 would fail in shear at approximately 110% of the tensile load at which the shoulders of collar 14 would fail.

As previously noted, the locking grooves 26a–e and shoulders defined thereby can be further constructed to have proportioned shear stiffness in accordance with the '053 Ruhl patent whereby failure will occur substantially simultaneously at all of the shoulders associated with effective lockgrooves 26a–e or the interlocking shoulders of swaged collar 14.

Utilizing the above criteria the volume of the shank portion 15 of pin 12 including the volume of the locking grooves 26a–e can be minimized. Thus in the manner as described above the total volume and hence weight of the pin member 12 will be minimized.

Figure 4:
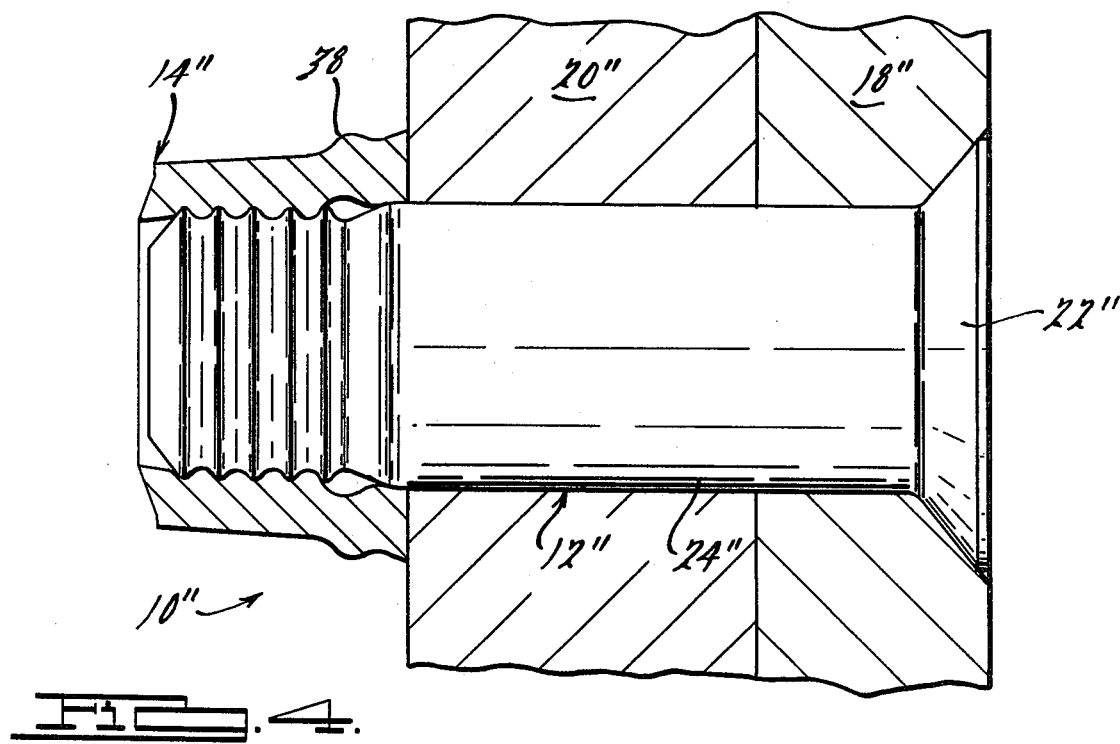
FIG. 4 is a view similar to that of FIG. 3 showing the fastener in a compressive failure mode.

It is next desirable to minimize the volume and hence weight of collar 14. The collar 14 must include a sufficient volume to adequately fill the locking grooves 26a–e and an additional external volume sufficient to ensure the structural integrity and/or load transfer capability of the swaged collar 14. In attempting to minimize the collar volume, it has been determined that a significant factor is the provision of sufficient radial wall thickness to withstand the magnitude of the design tensile load for fastener 10 via workpieces 18 and 20 without a compressive type failure of collar 14 (such a compressive failure is illustrated in FIG. 4). Looking now to FIGS. 1 and 2 the minimum dimensions of collar 14 to provide a minimum volume adequate to fill locking grooves 26a–e and yet to provide sufficient external structure to avoid compressive failure by a minimal, preselected margin can be predetermined by the following empirical relationships:

$$Da = 2\left[\frac{PtuFS}{\pi fcyK} + \left(\frac{Dx}{2}\right)^2\right]^{\frac{1}{2}} \quad (1)$$

$$Dc = \left[\frac{Da^2 - Dr^2}{1 - p^2} + ID^2\right]^{\frac{1}{2}} \quad (2)$$

where:
ID is inside diameter (inches) of collar 14 (before swage).
Dc is outside diameter (inches) of collar 14 (before swage).
Dr is mean diameter (inches) of the available volume between the roots and crests of lockgrooves 26a–e.
p is Poisson's Ratio.
Ptu is desired tensile carrying load (lbs) of workpieces 18 and 20.
Da is average Diameter (inches) of throat 36 of swage anvil 32.
fcy is the minimum compressive yield strength (psi) of material of collar 14.
K is a correction factor.
Dx is average diameter (inches) in area of minimum wall thickness of swaged collar 14 which is subjected to compressive load.

FS is multiplying factor to just assure that compressive failure will not occur.

Note that the dimension Dr represents that diameter for the section of the lockgrooves 26a–e which would provide a smooth, straight shank if the material of the shoulders were used to fill the lockgrooves 26a–e. For example if the volume of the lockgrooves 26a–e and the associated shoulders were the same then Dr would be the average of the crest diameter Dg and the diameter of the roots of grooves 26a–e. For a uniform threaded system Dr would be the pitch diameter. Where the volume of grooves 26a–e and associated shoulders differ Dr would be determined accordingly.

The diameter Dx can be readily determined as the average diameter of the collar 14 in the swaged portion in the vicinity of locking grooves 26a–e, i.e. the average diameter between Dg and the effective swaged outer surface of the collar 14. Presuming that the wall thickness of collar 14 is a minimum in this area then Dx could be used in the noted relationship (1) and (2) without further consideration.

As noted, however, the transition portion 28 will provide the greatest diameter (Ds) of the shank 15 and will be normally slightly greater than crest diameter Dg; in some grip conditions, the collar 14 will be swaged partially upon the transition portion 28 and hence will be ultimately swaged to its minimum wall thickness Tx in that area.

Thus the minimum wall thickness Tx of collar 14 can occur at an average diameter Dx' and can be less than the minimum wall thickness at diameter Dx. At the same time the parameters of Tx, Dx and Dx' can experience change under load conditions. All of these factors can be compensated by a 'correction factor' K which can be determined empirically. Thus the 'correction factor' K recognizes the wall thickness at diameter Dx' as being the weakest portion of the swaged collar 14 in compressive loading, i.e. and subject to the maximum compressive stress. The value of K can be determined for different sized fasteners and for different diameters at Dx, i.e. for different diameter pins 12, the K factors have been approximated as follows:

| K | 2.25 | 2.40 | 2.55 | 2.70 | 2.84 |
|---|------|------|------|------|------|
| Dx | .164 | .190 | .250 | .3125 | .375 |

The above K factors were determined considering that the grip increment for the different diameter pins was the same. If the grip increment were changed for different diameters then the K factors could be more nearly constant. Because of variations occurring under load, the final optimization can be confirmed through actual physical tests.

The multiplication factor (FS) in one application was selected to be 110%; thus, the tensile load at which a compressive failure occurs in collar 14 is 10% greater than the design tensile load at which the shoulders defined by the interlocking grooves of swaged collar 14 fail in shear. The above assures a shear failure first while minimizing the volume and weight of the collar 14.

The throat 36 is slightly tapered to facilitate release of the anvil 32 after swage and hence Da is represented as the average diameter of the throat 36 over its effective swage area. Note that the throat diameter Da of swage anvil 32 relative to the volume of collar 14 is selected to provide tight packing in locking grooves 26a–e with the material of swaged collar 14 to provide as complete a fill as possible. In one embodiment the volume of collar 14 was selected to provide 'overpacking', i.e. a volume of collar 14 to provide substantially more volume of collar material for filling grooves 26a–e than they could normally accept within the swage envelope defined by the throat 36 of the swage cavity of anvil 30 and the confronting portion of pin 12. In the present system, it has been found desirable to provide an excess volume of collar material which excess is greater than at least around 20%. Too much excess collar volume over the noted 20% can result in damage to the pin 12 via crushing or excessive elongation; this result can be determined empirically.

In prior (non-optimized) systems, an excess of collar volume of around 13% has been used to provide a reasonably good fill of the associated lockgrooves. However, in order to secure the significant advantages of the present optimized system in a production environment the 'overfill' or 'overpacking' should be selected to be at least around 20%. The material of the collar 14 and pin 12 react to accommodate the excess volume, i.e. collar elongation, etc. This does, however, assure that close to 100% fill will be realized after swage. When around at least the noted 20% 'overfill' has been utilized with such complete filling, it appears that a significant increase in shear stress capability (and hence tensile load capability) is realized in both the shoulders defined by lockgrooves 26a–e of the pin 12 and the shoulders defined by the interlocking grooves of swaged collar 14.

It appears that the above may be the result of maintained compressive preload between the flanks of the shoulders defined by lockgrooves 26a–e of pin 12 and the engaging flanks of the shoulders defined by the interlocking grooves of swaged collar 14. When such a compressive preload is maintained, it is believed that the ultimate shear strength of the materials increase, i.e. able to withstand higher shear loads when compared to the same materials where little or no compressive preload exists.

Thus it appears that the ultimate shear stress of the materials increase by at least around 10% to around 28% by such 'overpacking'. The amount of 'overpacking' is limited by the compressive yield strength of the material of pin 12. Considering the above in different terms, it has appeared, then that by applying sufficient 'overpacking', as noted, increases in the applied fastener tensile load can be obtained in the range of from at least around 10% to around 28% due to apparent increases in shoulder shear strengths. The latter significant increase in shear capability is in comparison to that attained with the present design where the excess volume has been up to around the 13% previously used (in non-optimized systems).

In order for the fastener 10 of the present invention to attain the design tensile load for the range of grip conditions noted subsequently and further for the 7° applications noted subsequently (see FIG. 7), it has been found advantageous to provide 'overpacking' up to the limit of the strength of the pin 12 whereby crushing, yielding, elongation or other degradation of the shank portion 24 and/or lockgrooves 26a–e of pin 12 is avoided. In one form of the present invention the volume of the collar 14 was selected to provide 'overpacking' within around 10% of that volume at which such degradation could incipiently occur.

In any event, while the volume of collar 14 is increased to provide the desired 'overfill' or 'overpacking', the resultant increase in shear strength and/or tensile load carrying capability more than compensates for the added volume permitting a reduction in size for the same design tensile load (without such 'overfill') resulting ultimately in a reduction in weight; at the same time the volume of the pin member 12 can be reduced resulting in savings of that material.

It also appears that the minimization of the number of locking grooves 26a–e and minimization of the overall length of the plurality grooves in combination with the 'overpacking' structure provides for good shear load transfer (via the associated shoulders) when in the tensile load mode. The percentage 'overfill' or 'overpacking' noted can be determined for a finite length (dl, see FIG. 1) at diameter Da of the effective swage portion of throat 36 by the relationship:

$$\frac{[(Dc^2 - ID^2) - (Da^2 - Dr^2)] \, dl}{[Da^2 - Dr^2] \, dl} = \% \text{ overfill}$$

(In the above 'dl' is considered to be a finite length within the swage portion of throat 36, considering the pin member 12 in the section of the lockgrooves 26a–e to be a smooth shank at mean diameter Dr).

Note that it is desirable that a fastener of a given size be capable of securing workpieces varying in total thickness. The fastener 10 of FIGS. 1 and 2 has that capability. Thus, FIGS. 1 and 2 depict the fastener 10 with workpieces 18 and 20 having the minimum total thickness for that fastener. With the minimum total thickness, the fastener 10 will have one lockgroove 26e only partially filled whereby the lockgrooves 26a–26d will be filled and will be effective to carry the tension load (see FIG. 2).

Figure 3:
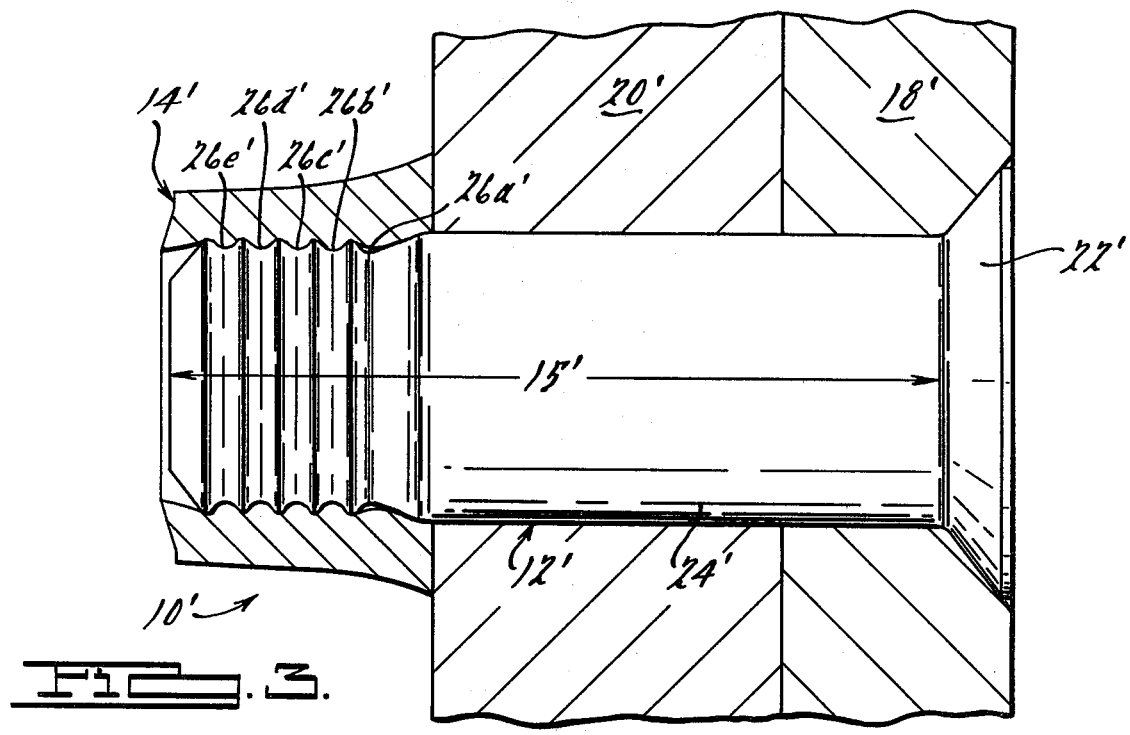
FIG. 3 is a view similar to that of FIG. 2 showing the fastener securing workpieces of a maximum thickness and with the tool removed.

In FIG. 3 workpieces 18' and 20' define the maximum combined thickness to be secured together by fastener 10'. In this case locking groove 26a' will be partially filled and lockgrooves 26b'–26e', which are filled, will be effective to carry the tension load. In the embodiment of FIG. 3 the fastener 10' is identical to the fastener 10 of FIGS. 1 and 2 and hence the components of FIG. 3 similar to like components of FIGS. 1 and 2 have been given the same numerical designation with the addition of a 'prime'. A description of the similar components of FIG. 3, for simplicity, has been omitted.

Note that in order to permit use of the fastener 10 (10') over the grip range shown, the lockgrooves 26a–26e require there to be one groove more than would be needed for the same tensile load if the fastener 10 (10') were used only in a nominal grip condition, i.e. a total thickness of workpieces which is in between that of workpieces 18 and 20 and 18' and 20'. Thus the one extra lockgroove permits an effective grip range for the fastener of workpieces having a variation in total thickness which is at least around twice the width of a single lockgroove. By thus limiting the grip range, the size of the fastener 10 will be minimized while still permitting a reasonable variation in grip. Note that further optimization could be realized by eliminating the last one (26e) of the lockgrooves 26a–26e and providing the fastener 10 for use only in nominal grip conditions.

As noted the volume of collar 14 is optimized by providing the minimum wall thickness whereby incipient or simultaneous failure at the tension design load can occur either through compressive failure, such as compressive yielding, or through shear of the shoulders defined by interlocking grooves of the collar 14 with shoulders defined by grooves 26a–26e of the pin 12. A compressive failure is illustrated in FIG. 4 where components similar to like components in FIGS. 1-3 have been given the same numerical designation with the addition of a 'double prime'; a description of such similar components has been omitted for simplicity. Note that the compressive failure is depicted at the area designated by the numeral 38.

Figure 5:
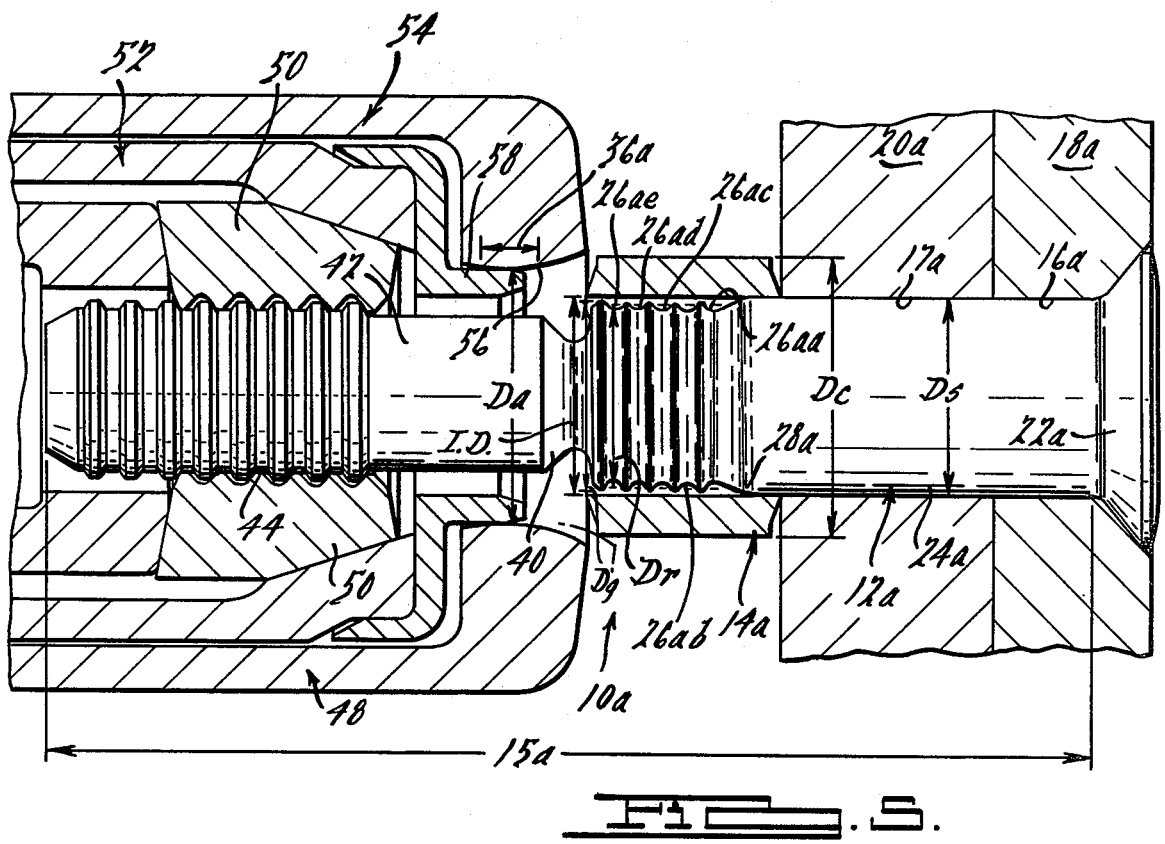
FIG. 5 is a longitudinal view with some portions shown in section and others shown broken away of a pull type fastener of the present invention and a tool for setting the same shown prior to setting the same and shown for securing workpieces of a nominal grip or thickness and with the engagement of the swage anvil of the tool shown in broken lines.
Figure 6:
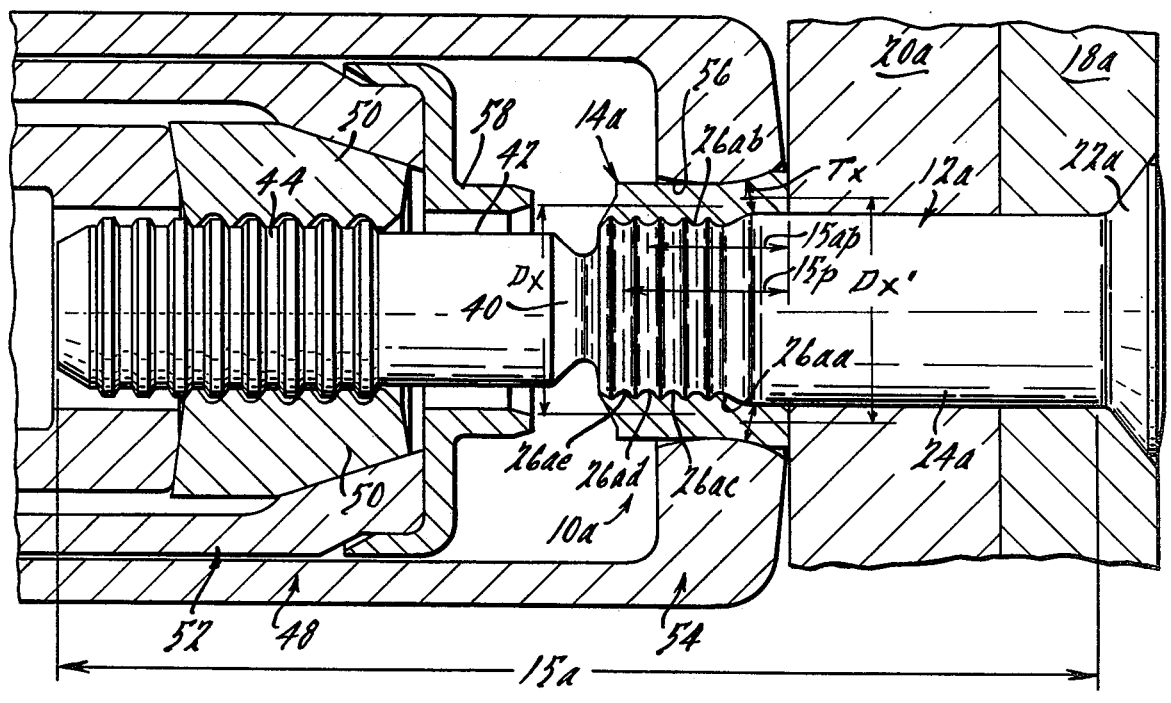
FIG. 6 is a view similar to that of FIG. 5 showing the fastener after it has been set (but before pin break) and with the tool still engaged.

The principles of the present invention are equally applicable to pull type, swage fasteners and are illustrated in the embodiment of FIGS. 5 and 6. In the embodiment of FIGS. 5 and 6 components similar to like components of the embodiment of FIGS. 1 and 2 are given the same numerical designation with the addition of the postscript 'a'.

Thus fastener 10a is shown to include pin member 12a and tubular collar 14a. Pin member 12a has an elongated shank 15a which extends through aligned openings 16a and 17a in a pair of workpieces 18a and 20a, respectively, to be secured together. The opening 16a terminates in a countersunk portion shaped to receive an enlarged flush type head 22a at one end of shank 15a. Adjacent the head 22a, the shank 15a has a straight portion 24a which is adapted to be received within bores 16a and 17a with a slight clearance or interference fit. Following the straight portion 24a is a plurality of locking grooves 26aa-ae. Transition portion 28a smoothly connects the locking groove 26aa with straight shank portion 24a.

A breakneck groove 40 is located adjacent the locking grooves 26aa-ae and defines the weakest portion on the shank 15a. A straight land 42 is located between the breakneck groove 40 and a plurality of pull grooves 44. The land 42 can be provided to be of a reduced diameter in accordance with U.S. Pat. No. 4,221,152 to H. Jason issued Sept. 9, 1980. The pull grooves 44 are adapted to be gripped by a tool 48 which is actuable to set the fastener 10a. The tool 48 can generally be constructed in a manner known to those skilled in the art and hence has been only partially shown for purposes of simplicity. Briefly, the tool 48 has a plurality of jaws 50 adapted to grip the pin 12a at pull grooves 44. Jaws 50 are located in a tubular collet assembly 52 which is slidably supported in an anvil housing 54 which terminates at one end in a swage anvil 56.

The symmetrically shaped, tubular collar 14a is adapted to be located over the shank 15a and, with the workpieces 18a, 20a pulled together, will be in radial alignment with the locking grooves 26aa-ae. Note that workpieces 18a and 20a have a combined thickness defining the nominal grip of the fastener 10a, i.e. between the thickness of workpieces 18, 20 of FIG. 1 and workpieces 18', 20' of FIG. 3, and hence the collar 14a will be aligned with and swaged into all of the lockgrooves 26aa-26ae (see FIG. 6). With actuation of the tool 48, a relative axial force is exerted between the pin 12a and collar 14a resulting in swaging of collar 14a into the locking grooves 26aa-26ae of pin 12a (see FIG. 6). Upon completion of the swaging, the shank 15a will be severed at the breakneck groove 40. A collar ejector member 58 will be urged forwardly to eject the swaged collar 14a from the anvil 56 upon further actuation of the tool 48.

The dimensional relationships between pin 12a, collar 14a and diameter of throat 36a of swage anvil 56 conform to those previously discussed with regard to the embodiment of FIGS. 1 and 2 and those dimensional relationships have been shown in FIGS. 5 and 6. Note that anvil 56 has an effective envelope to provide the desired "overfill" effect previously discussed.

It is desirable to be able to set a fastener 10a in workpieces in which the collar engaging surface of the forward workpiece is at an angle (X1) of 7° relative to a plane normal to the axis of the fastener. Such an application is shown in FIG. 7 where components similar to like components in FIGS. 5 and 6 have been given the same numerical designation with the addition of a 'prime'. For simplicity, the description of details of similar components has been omitted. Thus fastener 10a' is shown securing workpieces 18a' and 20a' where the forward surface 51 of workpiece 20a' is at an angle (X1) of 7° relative to a plane X2 normal to the axis X3 of pin 12a'.

By optimizing the fastener 10a' in the manner described above, the lockgroove portion of the fastener 10a' becomes more rigid than conventional fasteners. This occurs because the length of locking grooves 26aa'-ae' has been minimized while at the same time the length of collar 14a' has also been minimized. The result is a greater bending stress applied to breakneck groove 40'. The increase in bending stress, when combined with the tensile stress applied in setting the fastener 10a, may result in premature fracture, i.e. prior to completion of swaging of the collar 14a'. In order to permit application on the 7° incline it was determined that an increase in diameter d at breakneck groove 30a' would reduce the resultant bending stress. However, in order to provide fracture of breakneck groove 40' at the desired tensile load where substantially only tensile stresses are applied, i.e. angle X1 equals zero, the increase in diameter d could require undesirably higher tensile loads. It was determined that this could be offset by decreasing the stress concentration factor (Kt) for fatigue in breakneck groove 40. Looking to the drawing of FIG. 7, this was determined by generally utilizing the principles of the Neuber method. The Neuber method is set forth in Chapter 2, "Notches and Grooves", in "Stress Concentration Factors" by R. E. Peterson, 1974, John Wiley & Sons, Inc., (that material is incorporated herein by reference). Based upon the above relationship the Kt for breakneck groove 40' was selected such as to provide a desired effective diameter d of breakneck 40' to result in tensile fracture at the desired purely tensile load while still permitting application of the fastener 10a' at the 7° angle noted.

The diameter d at breakneck 40' is set to assure that premature fracture will not occur as a result of the combined bending and tensile stresses imposed in application of fastener 10' at the 7° angle. Next, utilizing the relationship of d/D a desired r/D ratio is determined to provide the desired stress concentration factor Kt for fracture at the desired pure tensile load. Examples of the above would provide a (d/D) (Kt) of 1.6 for a No. 10 fastener (for a nominal 3/16" diameter hole) and 1.7 for a ¼" fastener, (for a nominal ¼" diameter hole). The desired Kt provides fracture at breakneck 40' for pure tensile load and the 7° application to be approximately within around 12% of each other.

Thus an optimized No. 10 fastener 10 (10a) can have the following characteristics:
  A. Pin 12 (12a)
   1. Material = Titanium Alloy, 6Al-4V
   2. Ds = 0.189"
   3. Dg = 0.182"
   4. Dr = 0.173" grooves (a-e)
   5. Dr = 0.173" grooves (a-d)

6. R=0.085"
7. X=50°
6. a. Length of that portion of shank 15 extending beyond workpieces 18, 20 to the root of last groove (26e) for nominal (grip) combined thickness for pin with grooves 26a-e=0.159" (see 15p in FIG. 6).
   b. Grip range for variations in thickness of workpieces 18, 20 for pin with grooves 26a-e=0.094".
7. a. Length of that portion of shank 15 extending beyond workpieces 18, 20 to the root of last groove (26d) for nominal (grip) combined thickness for pin with one (26e) of grooves 26a-e eliminated=0.137" (see 15ap in FIG. 6).
   b. Grip range for pin with only grooves 26a-d=0.
8. Breakneck for Pin 12a.
   1. d=0.109"
   2. D=0.157"
   3. t=0.024"
   4. r=0.020"
   5. Kt=2.3
   6. (d/D) (Kt)=1.6
B. Collar 14 (14a)
   1. Material=Aluminum Alloy, 2024-T4(2)
   2. I.D.=0.19"
   3. Dc=0.27"
   4. a. Nominal Collar Length for Use With Pin With All Grooves 26a-e=0.225"
      b. Grip range of grooves 26a-e=0.094"
   5. a. Nominal Collar Length for Use with One Groove (26e) of grooves eliminated=0.202"
      b. Grip range of grooves 26a-d=0.
C. Anvil 30
   1. Da=0.246"
D. Ultimate Shear Strength Ratio Pin 12 (12a) to Collar 14 (14a).
   1. Ratio=2.5:1.
E. Multiplying Factor
   1. FS=1.10
F. Correction Factor
   1. K=2.40
G. "Overpacking"
   1. As determined by equation (3): "Overpacking"=21.2%.
H. Shear Load Strength
   1. Ratio of Shear Load Strength of Shoulders and Grooves of Pin 12 (12a) to Shoulders and Grooves of (swaged) Collar 14 (14a)=1.10:1.

The same relationships can be readily determined for a ¼" fastener 10 (10a) which could have the following characteristics (under nominal conditions):
A. Pin 12 (12a)
   1. Material=Titanium Alloy 6Al-4V
   2. Ds=0.249"
   3. Dg=0.242"
   4. Dr=0.229" (grooves a-e)
   5. Dr=0.229" (grooves a-d)
   6. R=0.122"
   7. X=50°
   8. a. Length of that portion of shank 15 extending beyond workpieces 18, 20 to the root of last groove (26e) for nominal (grip) combined thickness for pin with grooves 26a-e=0.209" (see 15p in FIG. 6).
      b. Grip range for variations in thickness of workpieces 18, 20 for pin with grooves 26a-e=0.094".
   9. a. Length of that portion of shank 15 extending beyond workpieces 18, 20 to the root of last groove (26d) for nominal (grip) combined thickness for pin with one (26e) of grooves 26a-e eliminated=0.177" (see 15ap in FIG. 6).
      b. Grip range for pin with only grooves 26a-d=0.
10. Breakneck for Pin 12a
    1. d=0.133"
    2. D=0.207"
    3. t=0.037"
    4. r=0.020"
    5. Kt=2.6
    6. (d/D) (Kt)=1.7
B. Collar 14 (14a)
   1. Material=Aluminum Alloy, 2024-T4(2)
   2. I.D.=0.250"
   3. Dc=0.356"
   4. a. Nominal Collar Length for Use With All Grooves 26a-e=0.283"
      b. Grip range of grooves 26a-e=0.094"
   5. a. Nominal Collar Length for Use with One Groove (26e) of grooves eliminated =0.251"
      b. Grip range of grooves 26a-d=0.
C. Anvil 30
   1. Da=0.325"
D. Ultimate Shear Strength Ratio Pin 12 (12a) to Collar 14 (14a).
   1. Ratio=2.5:1.
E. Multiplying Factor
   1. FS=1.10
F. Correction Factor
   1. K=2.55
G. "Overpacking"
   1. As determined by equation (3): "overpacking"=21.4%.
H. Shear Load Strength
   1. Ratio of Shear Load Strength of Shoulders and Grooves of Pin 12 (12a) to Shoulders and Grooves of (swage) Collar 14 (14a)=1.10:1.

Thus by employing the preceding teachings and balancing the weight and strength of the fastener components significant reductions in size and weight can be realized while still maintaining predetermined design criteria.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the materials utilized, said fastener comprising:

a pin member having an elongated shank including a smooth shank portion located in aligned openings in the workpieces and terminating in one end in an enlarged head and at its opposite end in a grooved portion comprising a plurality of circumferentially extending pin grooves and associated pin shoulders, said smooth shank portion being of a preselected length relative to the combined thickness of the workpieces such that said grooved portion will be located outside of and extend for a minimum length beyond the confines of the aligned openings, said smooth shank portion being of a diameter sufficient to provide the necessary shear strength to accept said design shear load, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, the axial widths of said pin grooves and shoulders and said collar grooves and shoulders being preselected in accordance with the relative shear strengths of said different materials whereby said pin shoulders and said collar shoulders are adapted to fail in shear generally at said design tensile load applied between said pin member and said collar, said collar having a minimum wall thickness, and hence weight, such that after swage compressive yielding could occur generally at said design tensile load, said collar being swaged into said pin grooves via a swage anvil having an effective throat swage portion, said collar having a predetermined volume of material which is generally at least around 20% greater than the available volume defined by said effective throat swage portion and the confronting portion of said pin grooves into which said collar is swaged.

2. The fastening system of claim 1 with said axial widths providing generally for said pin shoulders to fail at a tensile load just above said design tensile load whereby said collar shoulders generally fail before said pin shoulders.

3. The fastening system of claim 1 with said wall thickness of said collar selected for compressive yielding at tensile loads just above said design tensile loads whereby failure occurs in shear across said pin shoulders or said collar shoulders before compressive yielding of said collar.

4. The fastening system of claim 3 with said axial widths providing generally for said pin shoulders to fail at a tensile load just above said design tensile load whereby said collar shoulders generally fail before said pin shoulders.

5. The fastening system of claim 1 with said pin member prior to swage having a pintail portion connected with said grooved portion by a breakneck groove, said pintail portion adapted to be gripped by a tool actuable for applying a relative axial force between said pin member and said collar, said breakneck groove adapted to accept a combined tensile and bending load and to fracture at a preselected axial force after completion of swaging, said breakneck groove having a stress concentration factor providing for fracture at said preselected axial force and further providing for fracture within around 12% from said preselected axial force when said fastener is applied to workpieces having its collar engaging surface at an angle of 7° normal to the axis of said pin member, said stress concentration factor (Kt) being expressed by the relationship: (d/D) (Kt) where 'd' is the minimum diameter of said breakneck groove and D is the diameter of said pintail portion immediately adjacent said breakneck groove, said relationship being approximately 1.6 for said fastener for application in aligned openings of around 3/16" diameter where said smooth shank portion is around 0.189".

6. The fastening system of claim 1 with said fastener adapted to secure workpieces of a preselected total thickness and with said pin grooves being of just a sufficient number to accept said design tensile load.

7. The fastening system of claim 1 with said fastener adapted to secure workpieces of a preselected total thickness within a grip range varying at least around twice the width of one of said pin grooves, said pin grooves being of a number which is one greater than that required to provide said design tensile load, said collar being of a minimum length to engage all or all but one of said pin grooves when said fastener is applied to workpieces varying in total thickness by said grip range.

8. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the materials utilized, said fastener comprising:

a pin member having an elongated shank including a smooth shank portion located in aligned openings in the workpieces and terminating in one end in an enlarged head and at its opposite end in a grooved portion comprising a plurality of circumferentially extending pin grooves and associated pin shoulders, said smooth shank portion being of a preselected length relative to the combined thickness of the workpieces such that said grooved portion will be located outside of and extend for a minimum length beyond the confines of the aligned openings, said smooth shank portion being of a diameter sufficient to provide the necessary shear strength to accept said design shear load, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, the axial widths of said pin grooves and shoulders and said collar grooves and shoulders being preselected in accordance with the relative shear strengths of said different materials whereby said collar shoulders are adapted to fail in shear generally at said design tensile load and said pin shoulders at around 110% of said design tensile load applied between said pin member and said collar, said collar having a minimum wall thickness, and hence weight, such that after swage compressive yielding could occur generally at around 110% of said design tensile load, said collar being swaged into said pin grooves via a swage anvil having an effective throat swage portion, said collar having a predetermined volume of material which is generally at least around 20% greater than the available volume defined by said effective throat swage portion and the confronting portion of said pin grooves into which said collar is swaged.

9. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the materials utilized, said fastener comprising:

a pin member having an elongated shank including a smooth shank portion located in aligned openings in the workpieces and terminating in one end in an enlarged head and at its opposite end in a grooved portion comprising a plurality of circumferentially extending pin grooves and associated pin shoulders, said smooth shank portion being of a preselected length relative to the combined thickness of the workpieces such that said grooved portion will be located outside of and extend for a minimum length beyond the confines of the aligned openings, said smooth shank portion being of a diameter sufficient to provide the necessary shear strength to accept said design shear load, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the pin member having a higher ultimate shear stress than said collar with the ultimate shear stress of said collar being selected to be generally as high as possible without crushing said pin member during swage, said collar having a minimum wall thickness, and hence weight, such that, after swage, compressive yielding could occur generally at said design tensile load, said collar being swaged into said pin grooves via a swage anvil having an effective throat swage portion, said collar having a predetermined volume of material which is generally at least around 20% greater than the available volume defined by said effective throat swage portion and the confronting portion of said pin lock grooves into which said collar is swaged.

10. The fastening system of claim 9 with the ratio of ultimate shear stress of said pin member to said collar being in the range of from around 1.8 to around 2.7.

11. The fastening system of claim 9 with said pin member prior to swage having a pintail portion connected with said grooved portion by a breakneck groove, said pintail portion adapted to be gripped by a tool actuable for applying a relative axial force between said pin member and said collar, said breakneck groove adapted to accept a combined tensile and bending load and to fracture at a preselected axial force after completion of swaging, said breakneck groove having a stress concentration factor providing for fracture at said preselected axial force and further providing for fracture within around 12% from said preselected axial force when said fastener is applied to workpieces having its collar engaging surface at an angle of 7° normal to the axis of said pin member, said stress concentration factor (Kt) being expressed by the relationship: (d/D) (Kt) where 'd' is the minimum diameter of said breakneck groove and D is the diameter of said pintail portion immediately adjacent said breakneck groove, said relationship being approximately 1.6 for said fastener as applied to the aligned openings of around 3/16" diameter where said smooth shank portion is around 0.189".

12. The fastening system of claim 9 with said fastener adapted to secure workpieces of a preselected total thickness and with said pin grooves being of just a sufficient number to accept said design tensile load.

13. The fastening system of claim 9 with said fastener adapted to secure workpieces of a preselected total thickness within a grip range varying at least around twice the width of one of said pin grooves, said pin grooves being of a number which is one greater than that required to provide said design tensile load, said collar being of a minimum length to engage all or all but one of said pin grooves when said fastener is applied to workpieces varying in total thickness by said grip range.

14. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the material utilized, said fastener comprising:

a pin member having an elongated shank including a smooth shank portion located in aligned openings in the workpieces and terminating in one end in an enlarged head and at its opposite end in a grooved portion comprising a plurality of circumferentially extending pin grooves and associated pin shoulders, said smooth shank portion being of a preselected length relative to the combined thickness of the workpieces such that said grooved portion will be located outside of and extend for a minimum length beyond the confines of the aligned openings, said smooth shank portion being of a diameter sufficient to provide the necessary shear strength to accept said design shear load, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, said collar being swaged into said pin grooves via a swage anvil having an effective throat swage portion, said collar having a predetermined volume of material which is generally at least around 20% greater than the available volume defined by said effective throat swage portion and the confronting portion of said pin lock grooves into which said collar is swaged.

15. The fastening system of claim 14 with said pin member prior to swage having a pintail portion connected with said grooved portion by a breakneck groove, said pintail portion adapted to be grippei by a tool actuable for applying a relative axial force between said pin member and said collar, said breakneck groove adapted to accept a combined tensile and bending load and to fracture at a preselected axial force after completion of swaging, said breakneck groove having a steess concentration factor providing for fracture at said preselected axial force and further providing for fracture within around 12% from said preselected axial force when said fastener is applied to workpieces having its collar engaging surface at an angle of 7° normal to the axis of said pin member, said stress concentration factor (Kt) being expressed by the relationship: (d/D) (K/t) where 'd' is the minimum diameter of said breakneck groove and D is the diameter of said pintail portion immediately adjacent said breakneck groove, said relationship being approximately 1.6 for said fastener for application in the aligned openings of around 3/16" diameter where said smooth shank portion is around 0.189".

16. The fastening system of claim 14 with said fastener adapted to secure wcrkpieces of a preselected total thickness and with said pin grooves being of just a sufficient number to accept said design tensile load.

17. The fastening system of claim 14 with said fastener adapted to secure workpieces of a preselected total thickness within a grip range varying at least around twice the width of one of said pin grooves, said pin grooves being of a number which is one greater than that required to provide said design tensile load, said collar being of a minimum length to engage all or all but one of said pin grooves when said fastener is applied to workpieces varying in total thickness by said grip range.

18. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the materials utilized, said fastener comprising:

a pin member having an elongated shank including a smooth shank portion located in aligned openings in the workpieces and terminating in one end in an enlarged head and at its opposite end in a groove portion comprising a plurality of circumferentially extending pin grooves and associated pin shoulders, said smooth shank portion being of a preselected length relative to the combined thickness of the workpieces such that said grooved portion will be located outside of and extend for a minimum length beyond the confines of the aligned openings, said smooth shank portion being of a diameter sufficient to provide the necessary shear strength to accept said design shear load, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, said colar having a minimum wall thickness, and hence weight, such that, after swage, compressive yielding could occur generally at said design tensile load, said pin member prior to swage having a pintail portion connected with said grooved portion by a breakneck groove, said pintail portion adapted to be gripped by a tool actuable for applying a relative axial force between said pin member and said collar, said breakneck groove adapted to accept a combined tensile and bending load and to fracture at a preselected axial force after completion of swaging, said breakneck groove having a stress concentration factor providing for fracture at said preselected axial force and further providing for fracture within around 12% from said preselected axial force when said fastener is applied to workpieces having its collar engaging surface at an angle of 7° normal to the axis of said pin member, said stress concentration factor (Kt) being expressed by the relationship: (d/D) (Kt) where 'd' is the minimum diameter of said breakneck groove and D is the diameter of said pintail portion immediately adjacent said breakneck groove, said relationship being approximately 1.6 for said fastener for application in the aligned openings of around 3/16" diameter where said smooth shank portion is around 0.189".

19. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight, the fastener comprising a pin member having an elongated shank including a smooth shank portion adapted to be located in aligned openings in the workpieces and terminating in one end in an enlarged head and at its opposite end in a grooved portion comprising a plurality of circumferentially extending pin grooves and associated pin shoulders, the smooth shank portion being of a diameter sufficient to provide the necessary shear strength to accept said design shear load, a tubular collar adapted to be swaged into said pin grooves whereby the workpieces are fastened together, said collar when swaged having collar grooves and shoulders interlocking said pin grooves and shoulders, the method of optimizing the fastener comprising the steps of:

forming the smooth shank portion to be of a preselected length relative to the combined thickness of the workpieces whereby the grooved portion will be located outside of and extend for a minimum length beyond the confines of the aligned openings, forming the tubular collar to have a minimum length sufficient to overlay and to be swaged into the pin grooves, forming the pin member and collar from different materials having ultimate shear stresses with different magnitudes with the ratio of such shear stresses of the pin member to the collar being such that the pin member will substantially resist crushing during swage, forming the pin grooves and shoulders of preselected axial widths in accordance with the relative shear strengths of the different materials of the pin member and collar whereby the pin shoulders and collar shoulders formed in swaging will fail in shear generally at the design tensile load applied between the pin member and collar, the collar when formed having a predetermined volume of material which is at least around 20% greater than that required to fill the pin grooves when swaged to a minimum wall thickness, and swaging the collar to the minimum wall thickness which has a magnitude such that compressive failure could occur generally at the design tensile load.

20. The method of claim 19 with the collar swaged to the minimum wall thickness such that compressive yielding could occur generally at 110% of the design tensile load.

21. The method of claim 20 with the pin shoulders and collar shoulders formed such that the collar shoulders generally fail first in shear.

22. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight, the fastener comprising a pin member having an elongated shank including a smooth shank portion adapted to be located in aligned openings in the workpieces and terminating in one end in an enlarged head and at its opposite end in a grooved portion comprising a plurality of circumferentially extending pin grooves and associated pin shoulders, the smooth shank portion being of a diameter sufficient to provide the necessary shear strength to accept said design shear load, a tubular collar adapted to be swaged into said pin grooves whereby the workpieces are fastened together, said collar when swaged having collar grooves and shoulders interlocking said pin grooves and shoulders, the method of optimizing the fastener comprising the steps of:

forming the smooth shank portion to be of a preselected length relative to the combined thickness of the workpieces whereby the grooved portion will be located outside of and extend for a minimum length beyond the confines of the aligned openings, forming the tubular collar to have a minimum length sufficient to overlay and to be swaged into the pin grooves, the collar when formed having a predetermined volume of material which is at least around 20% greater than that required to fill the pin grooves when swaged to a minimum wall thickness, and swaging the collar to the minimum wall thickness which has a magnitude such that compressive yielding could occur generally at the design tensile load.

23. The method of claim 19 with the collar swaged to the minimum wall thickness such that compressive yielding could occur generally at 110% of the design tensile load.

24. In a fastening system, including a fastener, for securing a plurality of workpieces within a selected grip range from a minimum to a maximum thickness and with the fastening system having a required preselected magnitude of design shear load and a required preselected magnitude of design tensile load and with said fastener constructed to meet said design shear and tensile loads with a preselected minimum weight for the materials utilized, said fastener comprising:

a pin member having an elongated shank including a shank portion located in aligned openings in the workpieces and terminating in one end in an enlarged head and at its opposite end in a grooved portion comprising a plurality of circumferentially extending pin grooves and associated pin shoulders, said shank portion being of a preselected length relative to the combined thickness of the workpieces such that said grooved portion will generally extend for a minimum length beyond the confines of the aligned openings for the workpieces having a combined thickness at the maximum thickness of workpieces, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, the axial widths of said pin grooves and shoulders and said collar grooves and shoulders being preselected in accordance with the relative shear strengths of said different materials whereby said pin shoulders and said collar shoulders are adapted to fail in shear generally at said design tensile load applied between said pin member and said collar, said collar having a miniumu wall thickness such that after swage compressive yielding could occur generally at said design tensile load, said collar being swaged into said pin grooves via a swage anvil having an effective throat swage portion, said collar having a predetermined volume of material which is generally at least around 20% greater than the available volume defined by said effective throat swage portion and the confronting portion of said pin grooves into which said collar is swaged.

25. The fastening system of claim 24 with said wall thickness of said collar selected for compressive yielding at tensile loads just above said design tensile loads whereby failure occurs in shear across said pin shoulders or said collar shoulders before compressive yielding of said collar.

26. The fastening system of claim 24 with said pin member prior to swage having a pintail portion connected with said grooved portion by a breakneck groove, said pintail portion adapted to be gripped by a tool actuable for applying a relative axial force between said pin member and said collar, said breakneck groove adapted to accept a combined tensile and bending load and to fracture at a preselected axial force after completion of swaging, said breakneck groove having a stress concentration factor providing for fracture at said preselected axial force and further providing for fracture within around 12% from said preselected axial force when said fastener is applied to workpieces having its collar engaging surface at an angle of 7° normal to the axis of said pin member, said stress concentration factor (Kt) being expressed by the relationship: (d/D) (Kt) where 'd' is the minimum diameter of said breakneck groove and D is the diameter of said pintail portion iamediately adjacent said breakneck groove, said relationship being approximately 1.6 for said fastener for application is aligned openings of around 3/16" diameter where said smooth shank portion is around 0.189".

27. In a fastening system, including a fastener, for securing a plurality of workpieces within a selected grip range from a minimum to a maximum thickness and with the fastening system having a required preselected magnitude of design shear load and a required preselected magnitude of design tensile load and with said two piece fastener constructed to meet said design shear and tensile loads with a preselected minimum weight for the materials utilized, said fastener comprising:

a pin member having an elongated shank including a shank portion located in aligned openings in the workpieces and terminating in one end in an enlarged head and at its opposite end in a grooved portion comprising a plurality of circumferentially extending pin grooves and associated pin shoulders, said shank portion being of a preselected length relative to the combined thickness of the workpieces such that said grooved portion will generally extend for a minimum length beyond the confines of the aligned openings for the workpiece having a combined thickness at the maximum thickness of workpieces, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, the axial widths of said pin grooves and shoulders and said collar grooves and shoulders being preselected in accordance with the relative shear strengths of said different materials whereby said collar shoulders are adapted to fail in shear generally at said design tensile load and said pin shoulders at around 110% of said design tensile load applied between said pin member and said collar, said collar having a minimum wall thickness such that after swage compressive yielding could occur generally at around 110% of said design tensile load, said collar being swaged into said pin grooves via a swage anvil having an effective throat swage portion, said collar having a predetermined volume of material which is generally at least around 20% greater than the available volume defined by said effective throat swage portion and the confronting portion of said pin grooves into which said collar is swaged.

28. In a fastening system, including a fastener, for securing a plurality of workpieces within a selected grip range from a minimum to a maximum thickness and with the fastening system having a required preselected magnitude of design shear load and a required preselected magnitude of design tensile load and with said fastener constructed to meet said design shear and tensile loads with a preselected minimum weight for the materials utilized, said fastener comprising:

a pin member having an elongated shank including a shank portion located in aligned openings in the workpieces and terminating in one end in an enlarged head and at its opposite end in a grooved portion comprising a plurality of circumferentially extending pin grooves and associated pin shoulders, said shank portion of a preselected length relative to the combined thickness of the workpieces such that said grooved portion will generally extend for a minimum length beyond the confines of the aligned openings for the workpieces having a combined thickness at the maximum thickness of workpieces, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the pin member having a higher ultimate shear stress than said collar with the ultimate shear stress of said collar being selected to be generally as high as possible without crushing said pin member during swage, said collar having a minimum wall thickness such that, after swage, compressive yielding could occur generally at said design tensile load, said collar being swaged into said pin grooves via a swage anvil having an effective throat swage portion, said collar having a predetermined volume of material which is generally at least around 20% greater than the available volume defined by said effective throat swage portion and the confronting portion of said pin lock grooves into which said collar is swaged.

29. In a fastening system, including a fastener, for securing a plurality of workpieces within a selected grip range from a minimum to a maximum thickness and defining a selected grip range with the fastening system having a required preselected magnitude of design shear load and a required preselected magnitude of design tensile load and with said fastener constructed to meet said design shear and tensile loads with a preselected minimum weight for the material utilized, said fastener comprising:

a pin member having an elongated shank including a shank portion located in aligned openings in the workpieces and terminating in one end in an enlarged head and at its opposite end in a grooved portion comprising a plurality of circumferentially extending pin grooves and associated pin shoulders, said shank portion being of a preselected length relative to the combined thickness of the workpieces such that said grooved portion will generally extend for a minimum length beyond the confines of the aligned openings for the workpieces having a combined thickness at the maximum thickness of workpieces, a tubular collar swaged into said pin grooves whereby the workpieces are fastened together, said tubular collar being of a minimum length sufficient to overlay and to be swaged into said pin grooves, said swaged collar having collar grooves and shoulders interlocking said pin grooves and shoulders, said pin member and said collar being of different materials having ultimate shear stresses of different magnitudes with the ratio of such shear stresses of said pin member to said collar being such that crushing of said pin member in swage is substantially avoided, said collar being swaged into said pin grooves via a swage anvil having an effective throat swage portion, said collar having a predetermined volume of material which is generally at least around 20% greater than the available volume defined by said effective throat swage portion and the confronting portion of said pin lock grooves into which said collar is swaged.

30. The fastening system of claim 29 with said pin member prior to swage having a pintail portion connnected with said grooved portion by a breakneck groove, said pintail portion adapted to be gripped by a tool actuable for applying a relative axial force between said pin member and said collar, said breakneck groove adapted to accept a combined tensile and bending load and to fracture at a preselected axial force after completion of swaging, said breakneck groove having a stress concentration factor providing for fracture at said preselected axial force and further providing for fracture within around 12% from said preselected axial force when said fastener is applied to workpieces having its collar engaging surface at an angle of 7° normal to the axis of said pin member, said stress concentration factor (K/t) being expressed by the relationship: (d/D) (Kt) where 'd' is the minimum diameter of said breakneck groove and D is the diameter of said pintail portion immediately adjacent said breakneck groove, said relationship being approximately 1.6 for said fastener for application in the aligned openings of around 3/16" diameter where said smooth shank portion is around 0.189".

31. The fastening system of claim 29 with said fastener adapted to secure workpieces of a preselected total thickness within a grip range varying at least around twice the width of one of said pin grooves, said pin grooves being of a number which is one greater than that required to provide said design tensile load, said collar being of a minimum length to engage all or all but one of said pin grooves when said fastener is applied to workpieces varying in total thickness by said grip range.

* * * * *

UNITED STATES PATENT AND TRADEMARK OFFICE
CERTIFICATE OF CORRECTION

PATENT NO. : 4,472,096

DATED : September 18, 1984

INVENTOR(S) : John H. Ruhl & Richard D. Dixon

It is certified that error appears in the above-identified patent and that said Letters Patent is hereby corrected as shown below:

Column 8, line 16, before "[" insert --(3)--.
Column 17, line 4, delete "grippei" and substitute therefor --gripped--.
Column 17, line 9, delete "steess" and substitute therefor --stress--.
Column 17, line 16, delete "(K/t)" and substitute therefor --(Kt)--.
Column 18, line 4, delete "colar" and substitute therefor --collar--.
Column 20, line 34, "delete "miniumu" and substitute therefor --minimum--.
Column 21, line 25, delete "workpiece" and substitute therefor --workpieces--.
Column 22, line 7, after "portion" insert --being--.
Column 23, line 15, delete "conn-" and substitute therefor --con- --.
Column 24, line 5, delete "K/t)" and substitute therefor --(Kt)--.

Signed and Sealed this

Twelfth Day of March 1985

[SEAL]

Attest:

DONALD J. QUIGG

Attesting Officer   Acting Commissioner of Patents and Trademarks